July 27, 1937.    W. KOENIG, JR    2,088,297
HARMONIC ANALYZER
Filed Jan. 11, 1936
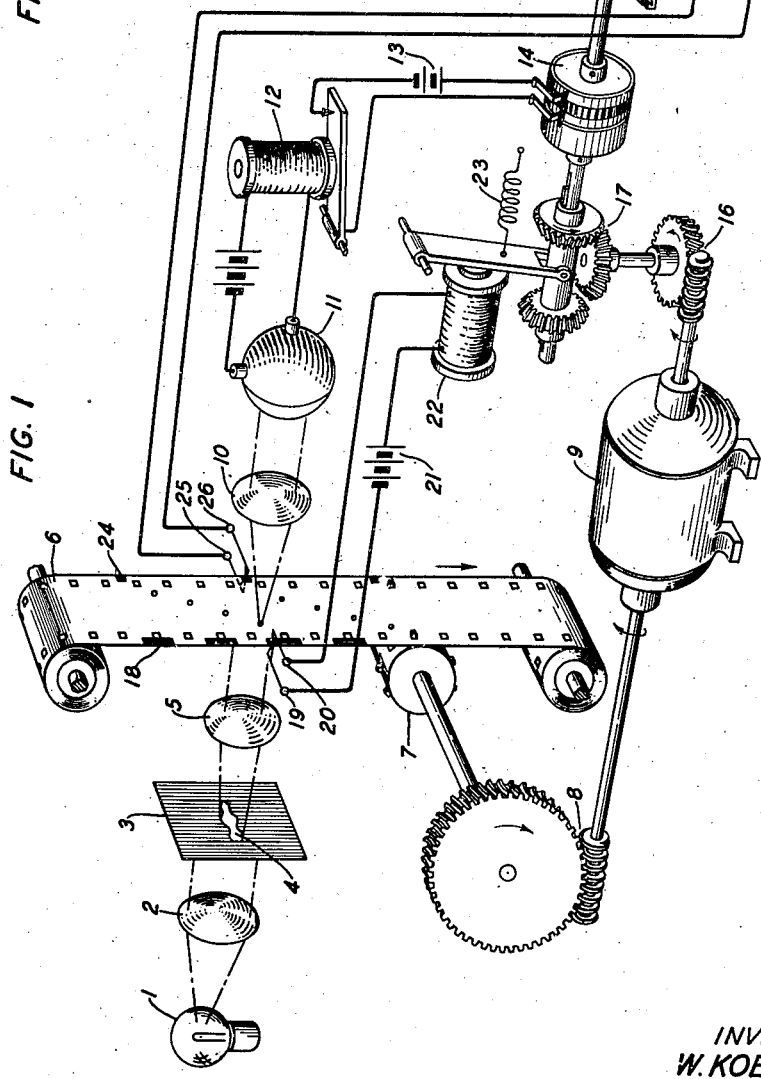
INVENTOR
W. KOENIG, JR.
BY
G. H. Heydt
ATTORNEY Patented July 27, 1937

2,088,297

UNITED STATES PATENT OFFICE 2,088,297

HARMONIC ANALYZER

Walter Koenig, Jr., Clifton, N. J., assignor to Bell Telephone Laboratories, Incorporated, New York, N. Y., a corporation of New York Application January 11, 1936, Serial No. 58,654

3 Claims. (Cl. 234—1.5)

This invention relates to machines designed for the interpretation or analysis of a given curve and particularly to that type of machine referred to as a harmonic analyzer.

The object of the invention is a machine which will analyze an optical image of a given curve and indicate the value of a component of the Fourier series represented in the curve.

A feature of the invention is the measurement by optical means of the height of a selected ordinate of an optical image of the given curve and the registration and recordation of the height of the given ordinate.

Another feature of the invention is the reversal of the registration of certain ordinates.

A further feature of the invention is an opaque moving mask which selects the ordinate of the image to be measured and controls the recording of a measure of the value of the ordinate.

The operation of the present machine is based upon the "selected ordinate" method of analyzing a non-sinusoidal curve into its component sinusoidal waves which was described by Fischer and Hinnen in Electrotechnische Zeitschrift, Volume 22, 1901, page 296, and in Principles of Alternating Current by Ralph R. Lawrence, page 92, published in 1922 by McGraw-Hill Book Company, Incorporated, 370 Seventh Avenue, New York City.

In the present invention a curve to be analyzed is in the form of an optical image. This image may be obtained by plotting the curve to be analyzed as a transparent area on an opaque screen or as an opaque area upon a transparent screen which is then illuminated and an image formed by a suitable optical system. The image of the curve is formed on a movable opaque belt and the magnification of the image adjusted until one period of the curve covers a definite width of the opaque belt. The belt has transparent areas so located as to select a desired ordinate and may be formed of any suitable opaque substance, such as a photographic film, a strip of paper, a strip of metal, etc. The transparent areas may be formed by photographic means, pierced mechanically, or made in any other suitable manner. When an illuminated portion of the image is aligned with a transparent area upon the belt the light transmitted through the belt excites a photoelectric cell. The excitation of the photoelectric cell operates the relay which starts a counter operating at any convenient rate related to the rotation of the shaft. As soon as a dark area of the image comes into alignment with the transparent area in the belt the light falling on the photoelectric cell will be cut off thus decreasing the current of the photoelectric cell, releasing the relay and stopping the counter. The belt may be traversed by any suitable means such as a sprocket driven by a hand operated crank, or by a motor, and the driving shaft of the sprocket also operates through a reversing gear the driving half of a magnetic clutch. The driven half of the clutch drives a counter which may be arranged when desired to print the value counted. Between certain excitations of the photoelectric cell the reversing gear is operated thus reversing the drive to the counting device and causing the device to count in the reverse direction. When all the ordinates for a given component have been scanned and counted the total is printed by the counting device and this total is a measure of the magnitude of the desired component.

In the drawing:

Fig. 1 diagrammatically shows the complete harmonic analyzer; and

Fig. 2 shows in detail the opaque moving belt.

In Fig. 1 light from a source 1 is focussed by a suitable condensing lens system 2 upon a screen 3 carrying a plot of the given curve 4. An image of the given curve 4 is formed by the lens system 5 upon a moving opaque belt 6. While the lens systems 2 and 5 have been represented as simple, spherical lenses it will be understood that other optical devices such as compound lens systems may be used in place of the simple lenses shown.

The lens systems 2 and 5 are adjusted so that an evenly illuminated image of the given curve is formed upon the moving opaque belt 6, Fig. 2, of such size that one period of the given curve exactly occupies the lateral distance L upon the moving belt. The lens systems 2 and 5 may, if desired, be mounted on the slides of an optical bench and the image of the curve may be focussed by sliding the lens systems, or, the lens systems may be individually mounted and moved by means of a nut on a finely threaded rod, or by a lever, or by any other means well known in the optical art. For convenience of adjustment the first part of the opaque belt 6 may be formed without perforations and having two lines inscribed thereon at the correct location and spaced exactly the distance L apart. Following this blank portion a series of small transparent areas are formed in the opaque belt. If the opaque belt be formed of a photographic film these transparent areas may be formed by photographic means; or if the opaque belt be formed of a strip of paper or metal the transparent areas may be pierced mechanically through the belt. In Fig. 2 the two series of transparent areas respectively for the cosine coefficient and the sine coefficient of the second harmonic are shown. The letter N shown on Fig. 2 indicates the order of the harmonic to be measured. In the case of the cosine coefficient of the second harmonic four transparent areas are formed across the width of the belt, the first area being formed at one edge of the width L and the other areas being spaced laterally therefrom a distance of $$\frac{L}{4}$$

The transparent areas are spaced longitudinally of the belt a distance slightly greater than the height of the given curve longitudinally of the belt. In the case of the upper series of transparent areas for the sine coefficient of the second harmonic, the first area is located laterally a distance of $$\frac{L}{8}$$

from the left edge of the image, the remaining areas being located laterally a distance of $$\frac{L}{4}$$

from each other. These areas, as before, are located longitudinally from each other a distance slightly greater than the longitudinal height of the image of the given curve.

The opaque belt 6 is traversed downward through the image of the given curve by any suitable means such as the sprocket 7 driven through the gears 8 by the motor 9 or by a hand operated crank. When one of the transparent areas is aligned with an illuminated portion of the image of the given curve light will be projected through the lens system 10 to the photoelectric cell 11. The current flowing in the photoelectric cell 11 suitably amplified, if required, operates the relay 12 closing a circuit for the battery 13 and thus energizing the magnetic clutch 14. When the clutch 14 is energized, the counting wheels 15 are rotated by the motor 9 through the gear 16 and the reversing gear 17. The counting wheels 15 are thus rotated steadily during the time that light is projected through the transparent area on to the photoelectric cell 11. The counting wheels thus form a record of the height of the illuminated image of the given curve longitudinally of the opaque belt. When the light ceases to shine through the transparent areas the relay 12 is released, deenergizing the clutch 14 and stopping the rotation of the counting wheels 15.

In this method of analysis the ordinates with odd numbers are used with alternate lines to determine the cosine coefficient and the ordinates with even numbers are used with alternate lines to determine the sine coefficient. It is therefore necessary to reverse the registration of the counting wheels 15 for each successive transparent area. This result may be obtained by placing contact operating areas upon the opaque belt 6 as represented by the rectangle 18. If the opaque belt 6 is formed of a non-conducting material these areas may be formed of some electrical conductors placed on or inserted into the belt. If the belt is formed of a conducting material, the areas may be cut out of the belt or raised upon the belt so as to operate contact devices. Any suitable method of closing a contact by means of a contact operating area on a moving belt may be used. As shown in Fig. 1, when the contacts 19 and 20 are closed, current from the battery 21 flows in the electromagnet 22 thus operating the reversing gear 17 as shown. When the contacts 19 and 20 pass off the area 18, the magnet 22 is deenergized and the spring 23 draws the reversing gear 17 to the right thus reversing the direction of rotation of the counting wheels 15.

When all the ordinates necessary for the determination of a given coefficient have been scanned and counted, a contact operating area 24 on the opaque belt 6 operates the contactors 25 and 26 permitting current from the battery 27 to flow in the electromagnet 28 and print the total in known manner upon a moving paper strip 29. The total thus obtained forms a measure of the cosine and sine coefficients of the given harmonics of the curve.

While certain mechanisms have been diagrammatically illustrated in Fig. 1, it will be understood that the invention is not limited to the specific mechanisms disclosed, but that other known suitable mechanisms may replace those illustrated.

What is claimed is:

1. A harmonic analyzer comprising an optical system for forming an image of a given curve wherein the illumination of the ordinates of the image varies laterally in accordance with the values of one cycle of the given curve, an opaque movable screen having light transmitting areas equally spaced laterally over a predetermined width of said screen, and longitudinally spaced a distance larger than the height of said image, the number of areas being twice the order of the harmonic being determined, means for adjusting the magnification of said image to cover the predetermined width on said opaque screen, a light sensitive device excited by the light transmitted through said transparent areas, a counting device continuously operated during the time that said light sensitive cell is excited and stopped when the excitation of said light sensitive cell ceases, and means for reversing the direction of counting of said counting device for alternate excitations of said light sensitive device.

2. A harmonic analyzer comprising a screen varying in the coefficient of light transmission of the ordinates laterally in accordance with the values of a given curve, means for uniformly illuminating the whole area of said screen, a movable opaque belt having transparent areas equally spaced over a predetermined width of said belt and longitudinally spaced a distance larger than the height of the image formed on said belt, the number of areas being twice the order of the harmonic being determined, means for forming an optical image of the light from said screen on said belt and adjusting the magnification of said image to the predetermined width, a light sensitive device excited by the light transmitted through the transparent areas on said movable belt, a counting device uniformly operated during the periods in which said light sensitive device is excited by the light transmitted through a transparent area in said belt, means for reversing the direction of counting of said counter for alternate excitations of said light sensitive device, and means responsive to structure on said movable belt for printing the total recorded on said counter for each group of transparent areas on said belt.

3. A harmonic analyzer comprising an opaque screen having a transparent area varying in height laterally of the screen in accordance with the values of one cycle of a given curve, means for uniformly illuminating the whole area of said screen, means for forming an image of the light from said screen, an apaque belt having light transmitting areas equally spaced laterally of said belt in accordance with the order of a harmonic of said curve and spaced longitudinally of said belt a distance larger than the height of said image, means for adjusting the magnification of said image to cover the width of said belt occupied by said transparent areas, a light sensitive device excited only by the light transmitted through said transparent areas, means for moving said belt at uniform speed, a counting device continuously operated during the time said light sensitive cell is excited and stopped when the excitation of said light sensitive cell ceases, gear mechanism for reversing the direction of said counting means, means responsive to structure on said belt to operate said gear mechanism after each transparent area has traversed said image, and means responsive to structure on said belt for printing the total of said counting means for each component of a harmonic of said curve.

WALTER KOENIG, Jr.